US012667871B2

(12) United States Patent
Nguyen et al.

(10) Patent No.: US 12,667,871 B2
(45) Date of Patent: Jun. 30, 2026

(54) EXTRACTOR AND METHOD OF USE

(71) Applicant: OK International, Inc., Cypress, CA (US)

(72) Inventors: Hoa Dinh Nguyen, Santa Ana, CA (US); Michael Carlomagno, Aliso Viejo, CA (US); Joshua Jacque Edberg, Mission Viejo, CA (US)

(73) Assignee: OK International, Inc., Cypress, CA (US)

( * ) Notice: Subject to any disclaimer, the term of this patent is extended or adjusted under 35 U.S.C. 154(b) by 459 days.

(21) Appl. No.: 18/086,444

(22) Filed: Dec. 21, 2022

(65) Prior Publication Data

US 2024/0207910 A1    Jun. 27, 2024

(51) Int. Cl.
*B08B 15/04*        (2006.01)
*B23K 3/08*        (2006.01)
(52) U.S. Cl.
CPC ............... *B08B 15/04* (2013.01); *B23K 3/08* (2013.01)
(58) Field of Classification Search
CPC ...... B01D 46/62; B01D 46/001; B01D 46/00; B01D 46/88; A47L 9/106; B08B 15/00; B08B 15/04; B08B 5/04
See application file for complete search history.

(56) References Cited

U.S. PATENT DOCUMENTS 6,395,047 B1    5/2002  Smith
6,663,698 B2 *  12/2003  Mishin ................... B23K 9/324
                                         96/147
11,806,653 B2 *  11/2023  Farr ........................ A61M 1/84
2003/0029321 A1    2/2003  Mishin et al.
2022/0016557 A1    1/2022  Farr

FOREIGN PATENT DOCUMENTS

CN          1826163  A     8/2006
CN        109068907  A    12/2018
CN        211539855  U     9/2020
CN        212017276  U    11/2020
CN        115427733  A    12/2022
CN        217939545  U    12/2022
GB        201915106        12/2019
GB          2588228  A     4/2021
KR      20060094718  A  *  1/2013  ............. B01D 46/00

OTHER PUBLICATIONS

Kang (Year: 2013).*
Extended European Search Report dated Dec. 19, 2023 in European Patent Application No. 23182008.5.
Office Action and Search Report in Chinese Appln. No. 202310825897.0, mailed on Jan. 21, 2026, 16 pages (with English translation).

* cited by examiner

*Primary Examiner* — Sharon Pregler
(74) *Attorney, Agent, or Firm* — Fish & Richardson P.C.

(57) ABSTRACT

A method of using an extractor for extracting harmful chemicals and particulates from air for a soldering iron station, the extractor including an intake assembly, a filter assembly, a fan, and an exhaust assembly, comprising receiving harmful chemicals, particulates, and air from the soldering iron station through the intake assembly; filtering the fumes from the air with the filter assembly; and exhausting the filtered air with the exhaust assembly.

12 Claims, 14 Drawing Sheets

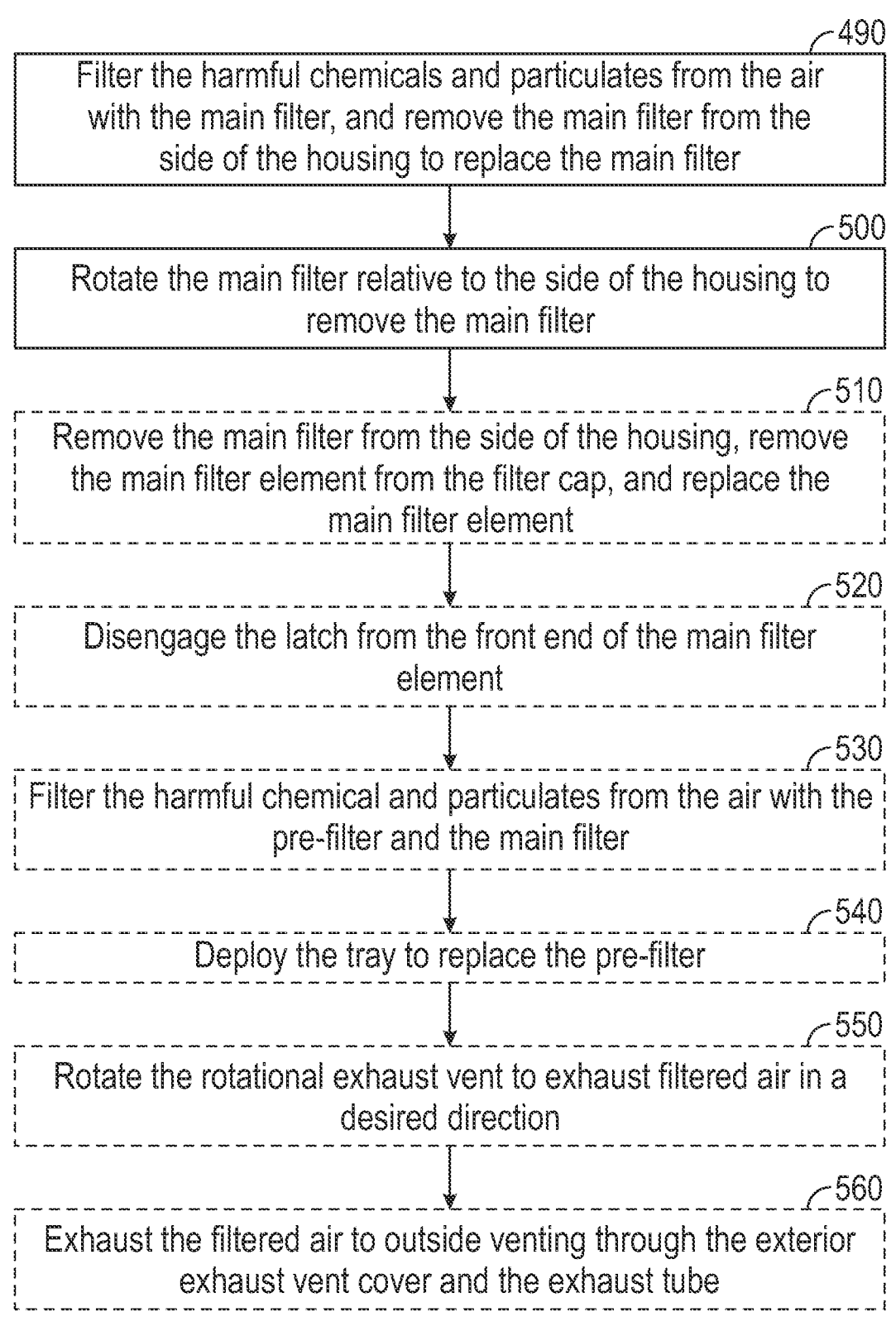

490

Filter the harmful chemicals and particulates from the air with the main filter, and remove the main filter from the side of the housing to replace the main filter

500

Rotate the main filter relative to the side of the housing to remove the main filter

510

Remove the main filter from the side of the housing, remove the main filter element from the filter cap, and replace the main filter element

520

Disengage the latch from the front end of the main filter element

530

Filter the harmful chemical and particulates from the air with the pre-filter and the main filter

540

Deploy the tray to replace the pre-filter

550

Rotate the rotational exhaust vent to exhaust filtered air in a desired direction

560

Exhaust the filtered air to outside venting through the exterior exhaust vent cover and the exhaust tube

FIG. 6 (Continued)

EXTRACTOR AND METHOD OF USE

FIELD OF THE INVENTION

The disclosure relates to extraction systems that utilize a fan to pull hazardous gasses and particles through a filtering system to remove and neutralize the air of harmful chemical and particulates.

BACKGROUND OF THE INVENTION

Extraction systems include a filtering system to remove and neutralize air of harmful chemical and particulates. A problem with some extraction systems in the past is that they include a cover with an air intake incorporated therein. To change a pre-filter and/or a main filter, the cover with air intake had to be pivoted open or removed to access the pre-filter and/or a main filter. To change the main filter, the pre-filter first had to be removed. Consequently, changing the pre-filter and/or the main filter was neither convenient nor easy. Further, exhaust air from the extraction system, which rested on a floor by a user's feet, often blew on and cooled a user's feet, making them uncomfortable.

SUMMARY OF THE INVENTION

Aspects of the disclosure involve an extractor for extracting harmful chemicals and particulates from the air around a workstation such as, but not limited to, a soldering iron station comprising an intake assembly configured to receive harmful chemicals, particulates, and air, a filter assembly configured to filter the harmful chemicals and particulates from the air, a fan configured to transport the harmful chemicals, particulates, and air into the filter assembly, and an exhaust assembly configured to exhaust filtered air.

One or more implementations of the above aspects comprises one or more of the following: the intake assembly includes flexible intake tubes each with a proximal portion and a distal portion; the proximal portions include nozzles, which include nozzle inlet screen receivers that receive replaceable nozzle inlet screens; the replaceable nozzle inlet screens include tabs that allow a user to handle the replaceable nozzle inlet screens; the replaceable nozzle inlet screens provide a first filter to capture large items such as paper wipes that are drawn into the intake assembly via the nozzles; the proximal portions include respective fans that move the air, harmful chemicals, and particulates into the intake assembly; the fans include an outer periphery that the nozzles slide onto; the filter assembly includes a pre-filter, a main filter, and impregnated activated carbon; the pre-filter is a disposable liner to remove large particles before entering the main filter; the pre-filter is placed in a pre-filter tray, which is removable/insertable relative to an upper portion of a front section of the housing; the main filter along with the impregnated activated carbon is externally removable; the main filter is held in place by a filter holder with a releasable latch on a peripheral portion of a front face of the filter holder; the releasable latch disengages the main filter element, allowing main filter element and filter holder to be rotated relative to each other to separate the main filter element relative to the filter holder to replace the main filter element; the main filter is rotatably coupled to and insertable/removable relative to the front section of the housing, below the pre-filter, for replacing the main filter element; the exhaust assembly includes a rotational exhaust vent that is rotatably coupled to a rear section of the housing for 360 degree rotation to adjust the direction of exhaust air flow from the extractor; an exterior exhaust vent cover is coupled to the rear section of the housing; and/or a L-shaped exhaust tube is coupled to the exterior exhaust vent cover to connect the exhaust assembly to outside venting.

Another aspect involves a method of using an extractor for extracting harmful chemicals and particulates from air for a soldering iron station, the extractor including an intake assembly, a filter assembly, a fan, and an exhaust assembly, comprising receiving harmful chemicals, particulates, and air from the soldering iron station through the intake assembly; filtering the harmful chemicals and particulates from the air with the filter assembly; and exhausting the filtered air with the exhaust assembly.

One or more implementations of the above aspect include one or more of the following: the intake assembly includes an intake path and an intake fan disposed therein, and receiving comprising pulling harmful chemicals, particulates, and air from the soldering iron station through the intake path with the intake fan; the intake assembly includes an intake path and replaceable intake screen therein, and the method further comprising replacing the replaceable inlet screen of the intake assembly; the replaceable inlet screen include a tab, and replacing comprising handling the replaceable inlet screen by the tab when replacing the replaceable inlet screen of the intake assembly; the intake assembly includes a nozzle, an intake port, and a replaceable inlet screen disposed therein, and receiving comprising receiving harmful chemicals, particulates, and air from the soldering iron station through the nozzle, intake port, and replaceable inlet screen of the intake assembly; the intake assembly includes a pair of intake tubes with respective nozzles, and receiving comprising receiving harmful chemicals, particulates, and air from the soldering iron station through the nozzles and intake tubes of the intake assembly; the extractor includes a housing with one or more sides and the filter assembly includes a main filter removable with respect to a side of the one or more sides of the housing, filtering comprising filtering the fumes from the air with the main filter, and the method further comprising removing the main filter from the side of the housing to replace the main filter; removing includes rotating the main filter relative to the side of the housing to remove the main filter; the main filter includes a filter holder and a main filter element, and removing includes removing the main filter from the side of the housing, removing the main filter element from the filter holder, and replacing the main filter element; the main filter element includes a front end, the filter holder includes a peripheral portion with a latch that engageable with the front end of the main filter element, and removing the main filter element from the filter holder includes disengaging the latch from the front end of the main filter element; the filter assembly includes a pre-filter, and filtering comprising filtering the fumes from the air with the pre-filter and the main filter; the filter assembly includes a tray with the pre-filter that deploys from the side of the housing to replace the pre-filter, and the method further comprising deploying the tray to replace the pre-filter; the exhaust assembly includes a rotational exhaust vent, and the method further comprising rotating the rotational exhaust vent to exhaust filtered air in a desired direction; and/or the exhaust assembly includes an exterior exhaust vent cover and an exhaust tube coupled to the exterior exhaust vent cover, and exhausting includes exhausting the filtered air to outside venting through the exterior exhaust vent cover and the exhaust tube.

DETAILED DESCRIPTION OF THE INVENTION

Figure 1:
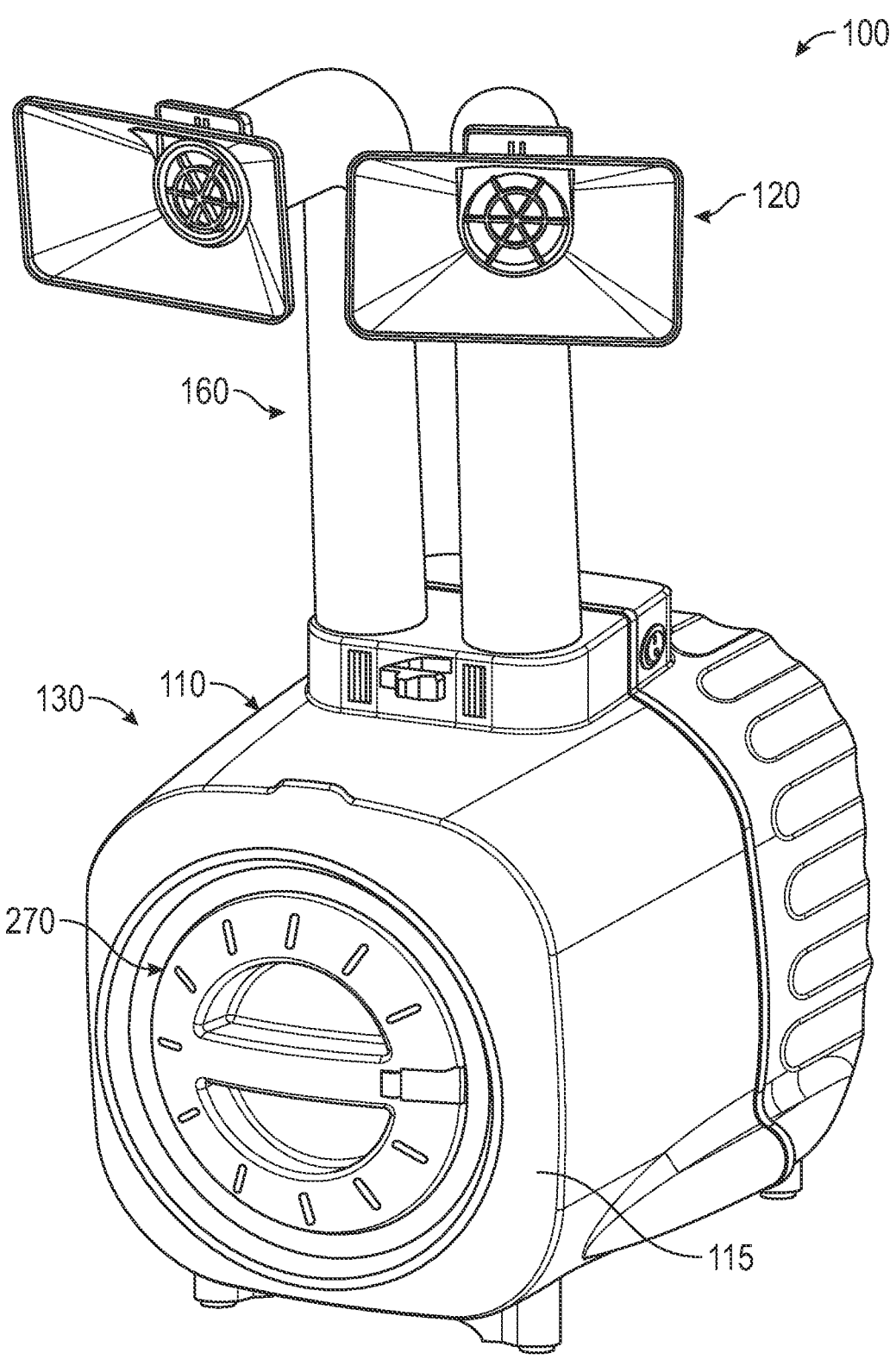
FIG. 1 is a front perspective view of an embodiment of an extractor that removes and neutralizes air of harmful chemical and particulates.
Figure 2:
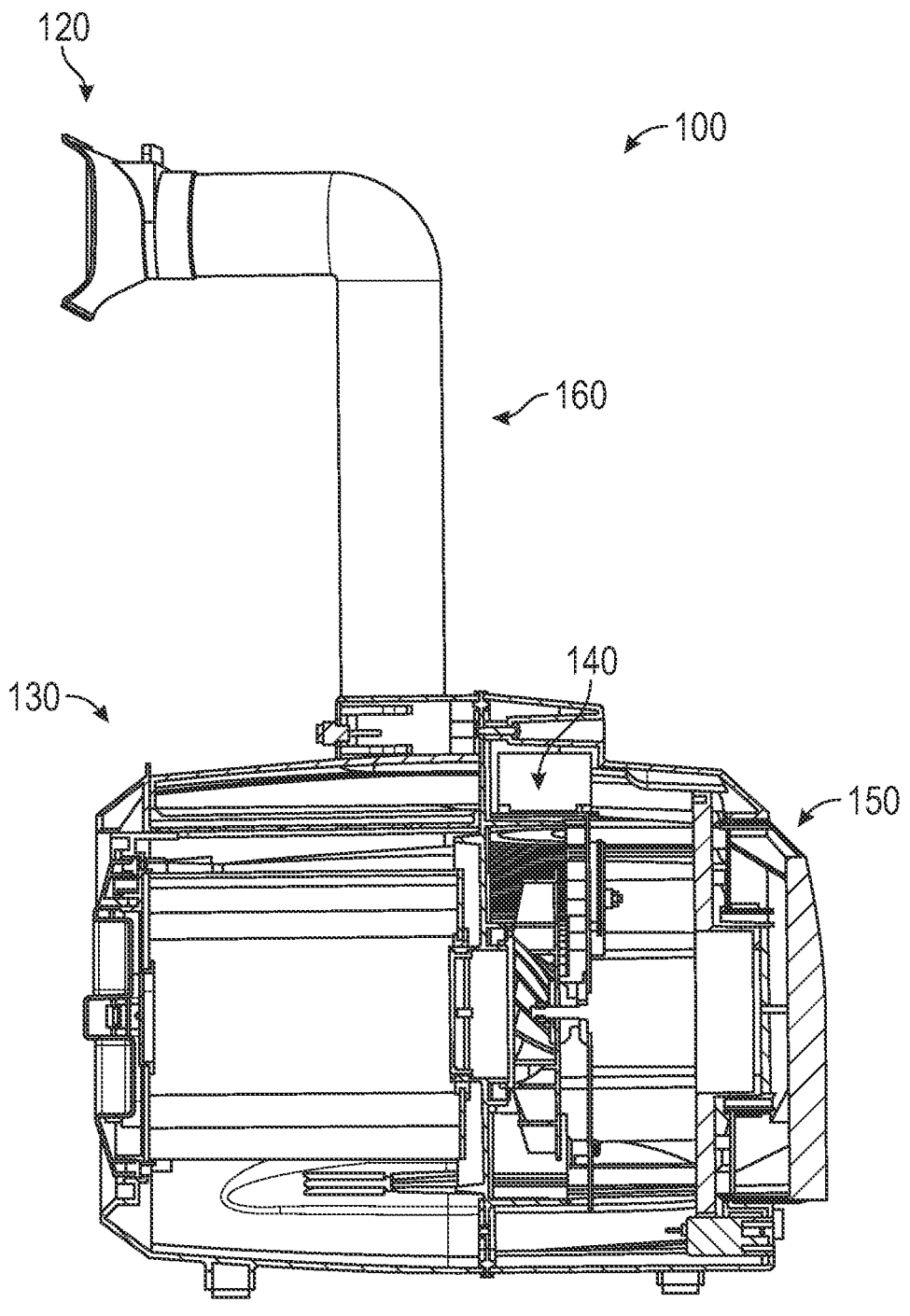
FIG. 2 is a cross-sectional view of the extractor of FIG. 1.

With reference to FIGS. 1 and 2, an embodiment of an extractor 100 for extracting harmful chemical and particulates from air for a soldering iron station will be described. In alternative embodiments, the extractor 100 is used for extracting any fumes or particles such as coating, spraying, nail salons, laser marking, welding, cutting, grinding, chemical applications, smelting, brazing, molding, powder filling, solvent use of production, pharmaceutical labs, manufacturing, medical field, etc. other than for a soldering iron station. The extractor 100 includes a housing 110 with one or more sides 115, an intake/inlet assembly 120, a filter assembly 130, a fan 140, and an exhaust assembly 150.

Figure 3A:
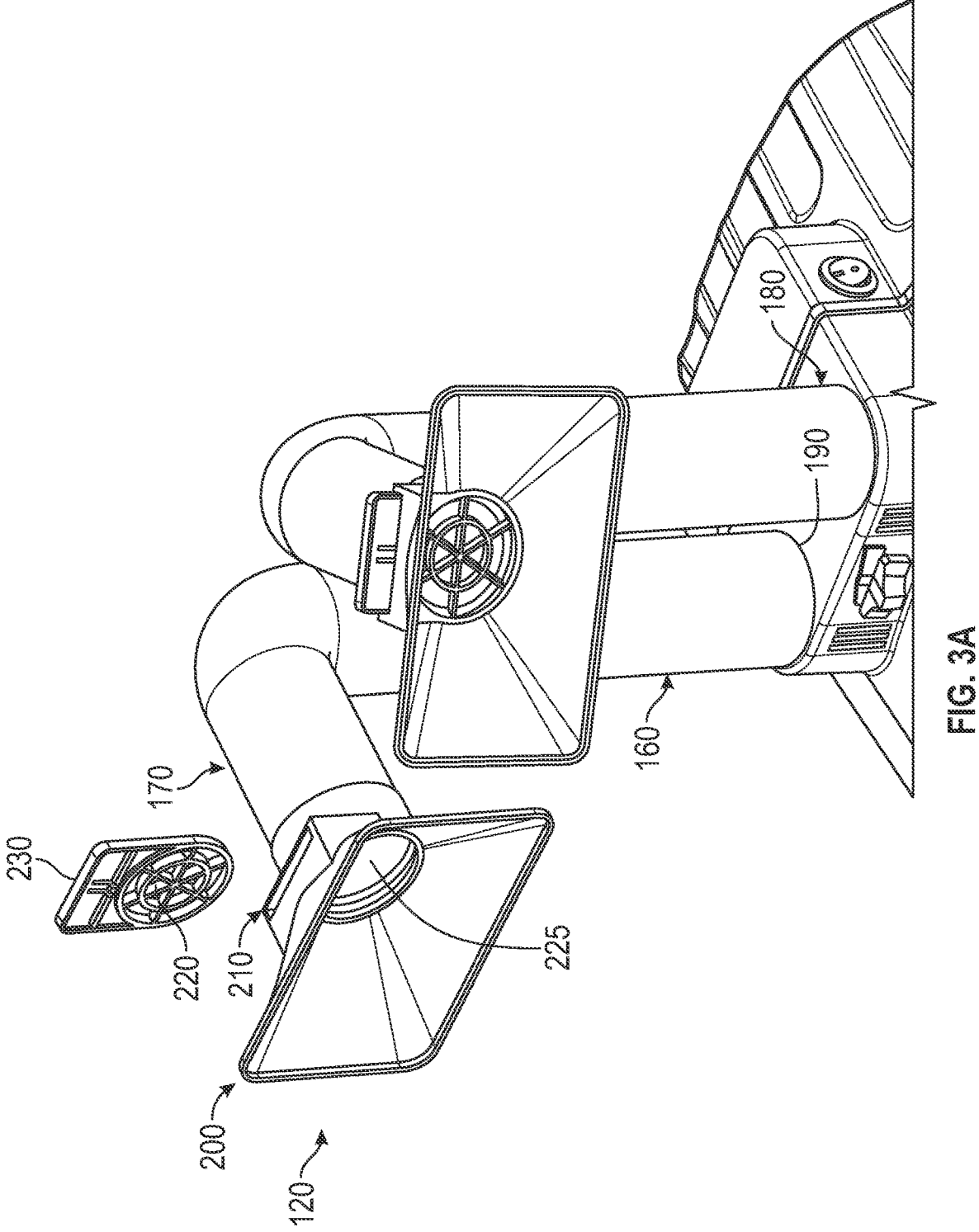
FIG. 3A is an enlarged front perspective view of an intake assembly of the extractor of FIG. 1 and shows removal of a nozzle inlet screen of the intake assembly to replace the nozzle inlet screen.
Figures 3B, 3C:
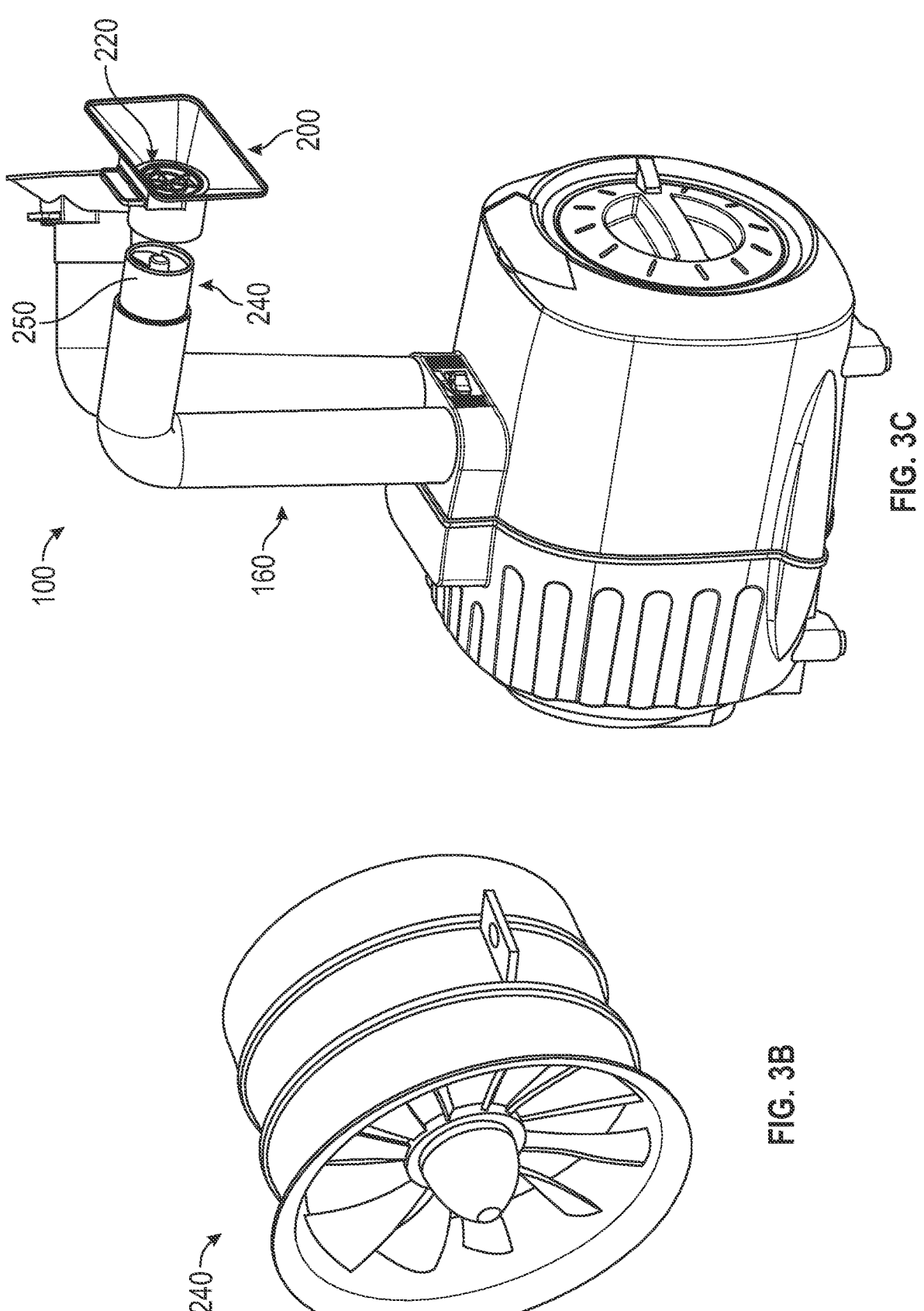
FIG. 3B is a perspective view of a fan of the intake assembly.
FIG. 3C is a perspective view of the extractor and shows the fan of FIG. 3B disposed within the intake assembly.
Figure 4A:
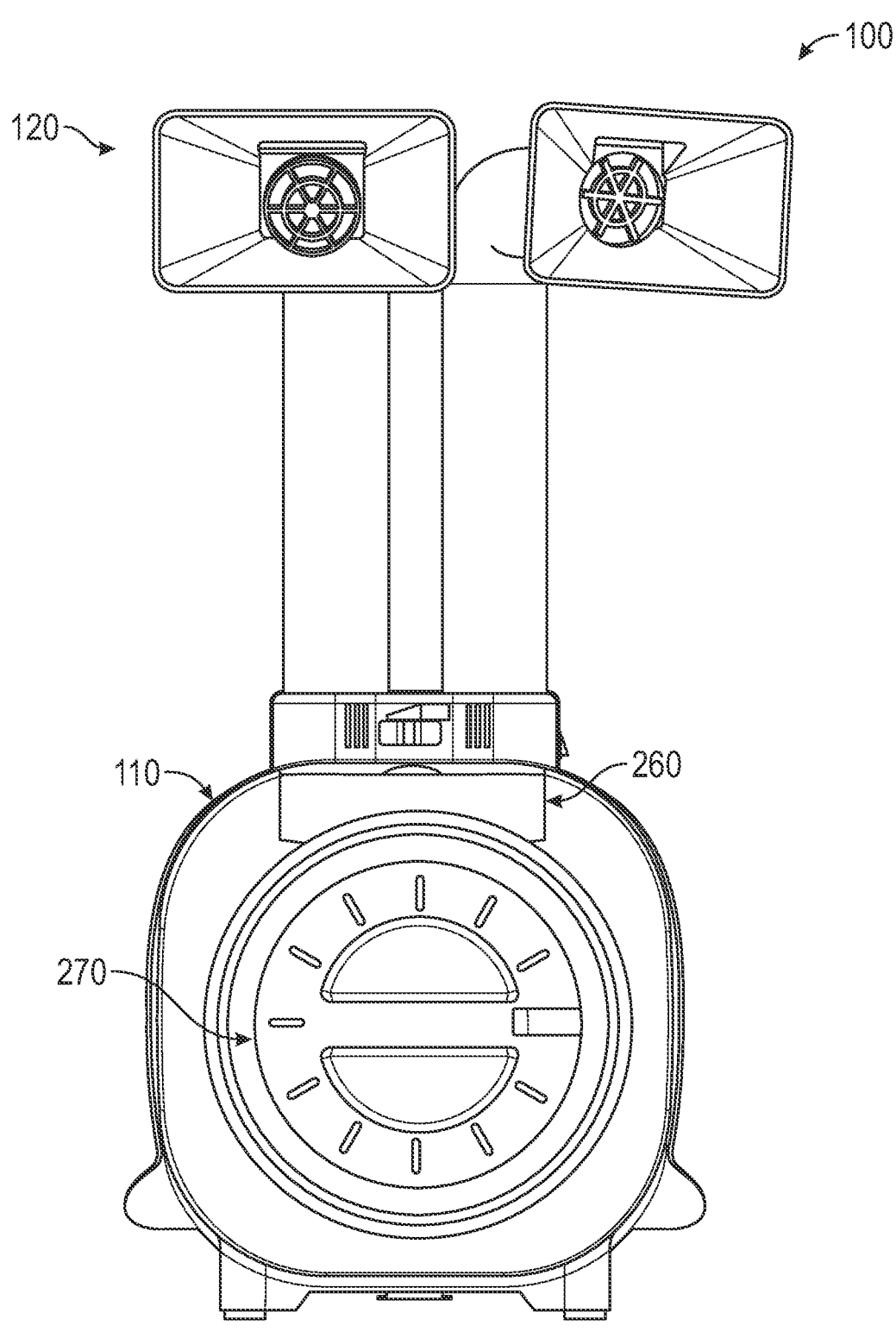
FIG. 4A is front elevational view of the extractor of FIG. 1.
Figure 4B:
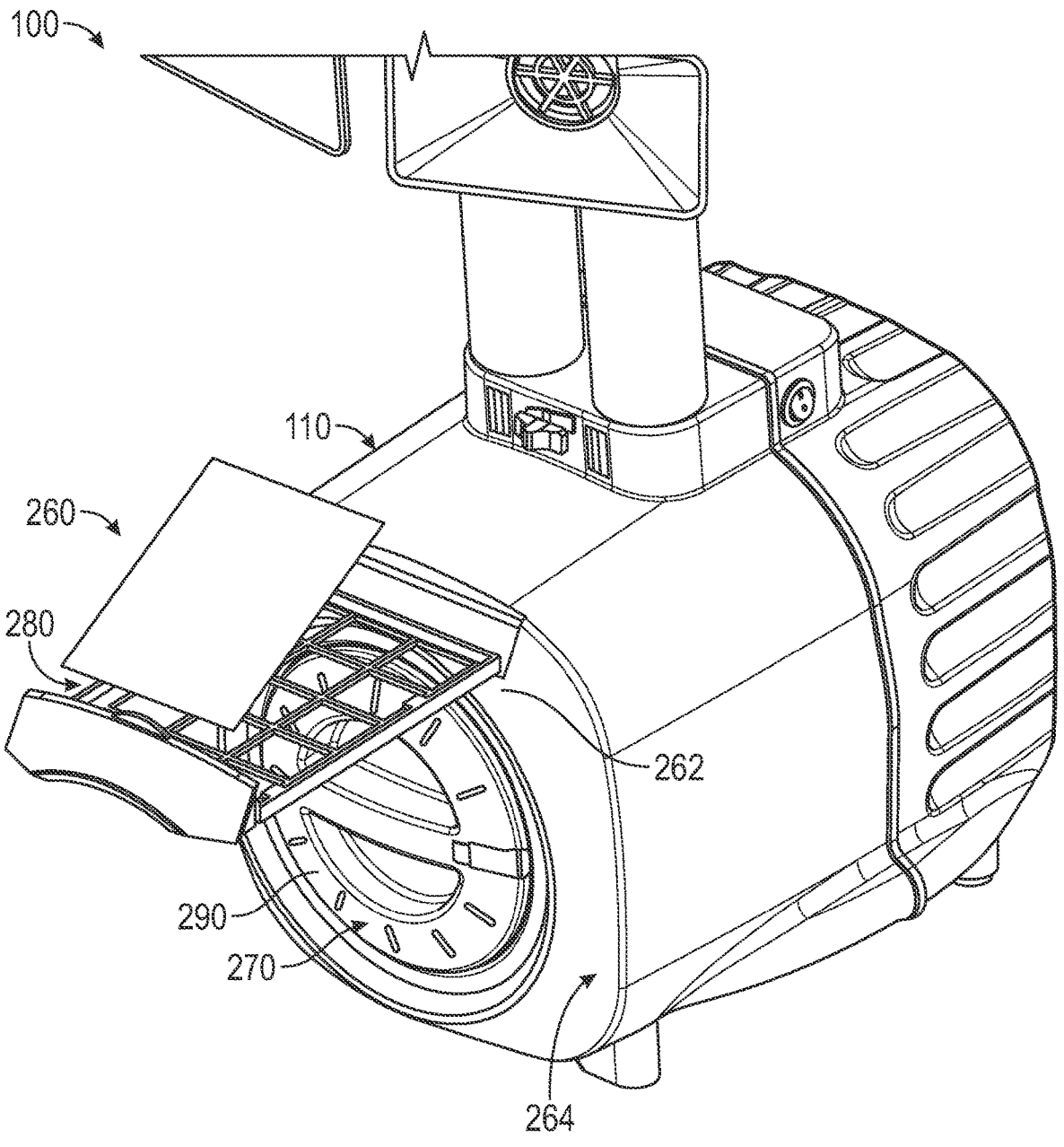
FIG. 4B is a front perspective view of the extractor of FIG. 1, and shows removal and replacement of a pre-filter.
Figure 4C:
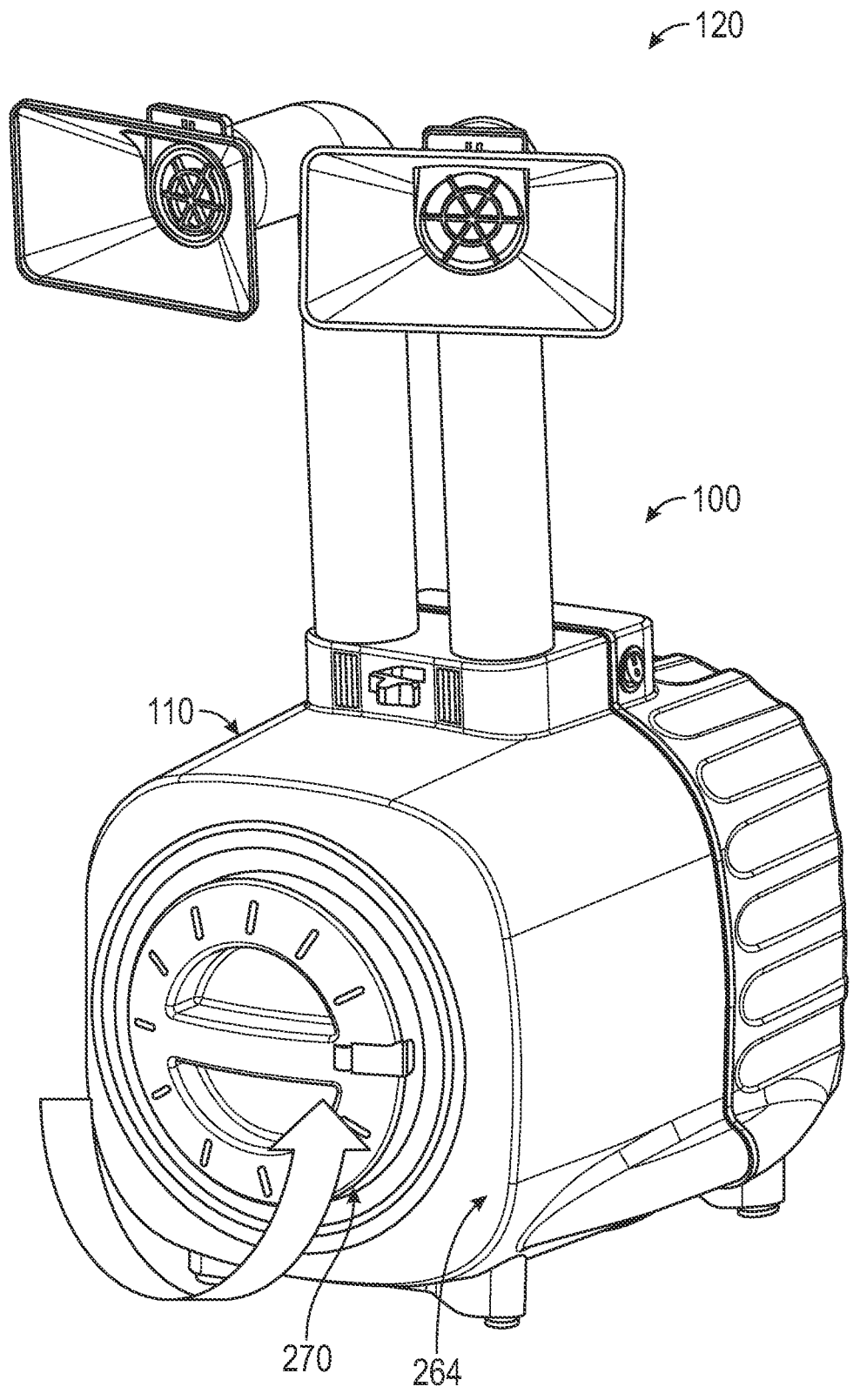
FIG. 4C is a front perspective view of the extractor of FIG. 1, and shows rotation of the main filter of the filter assembly for removal and replacement of a main filter.
Figure 4D:
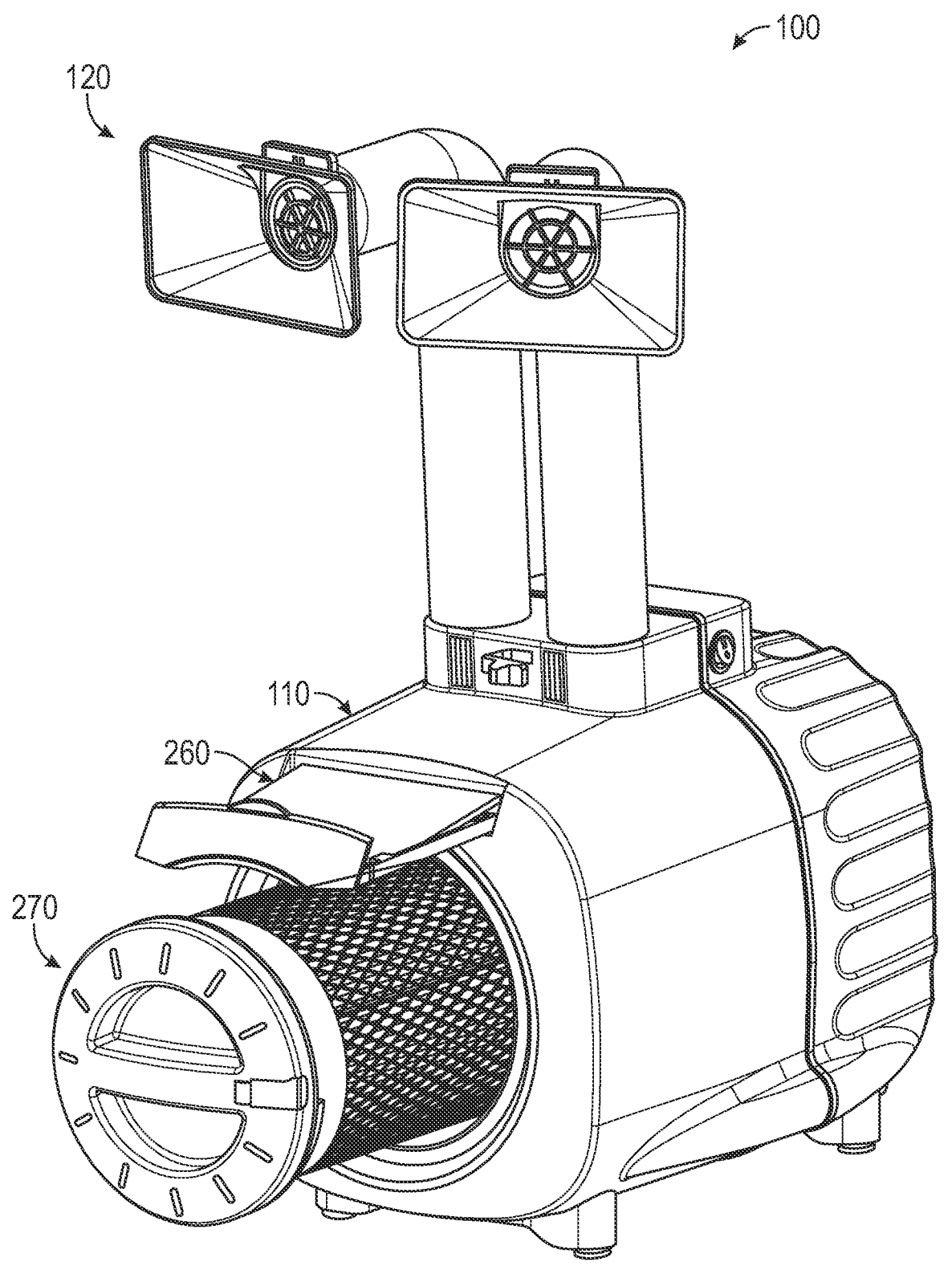
FIG. 4D is another front perspective view of the extractor of FIG. 1, and shows both the removable pre-filter and the removable main filter of the filter assembly.
Figure 4E:
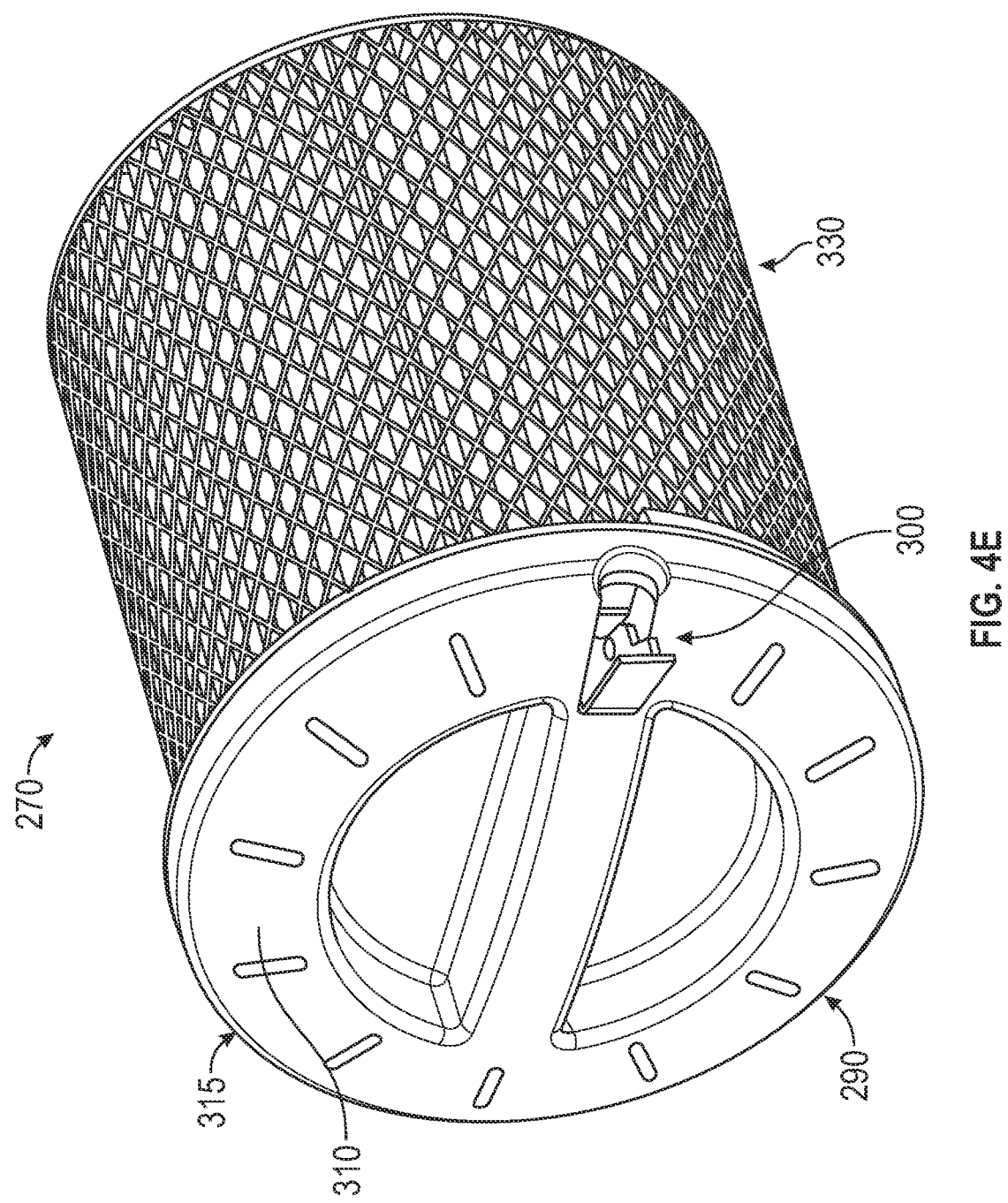
FIG. 4E is a perspective view of the removable main filter of the filter assembly.
Figure 4F:
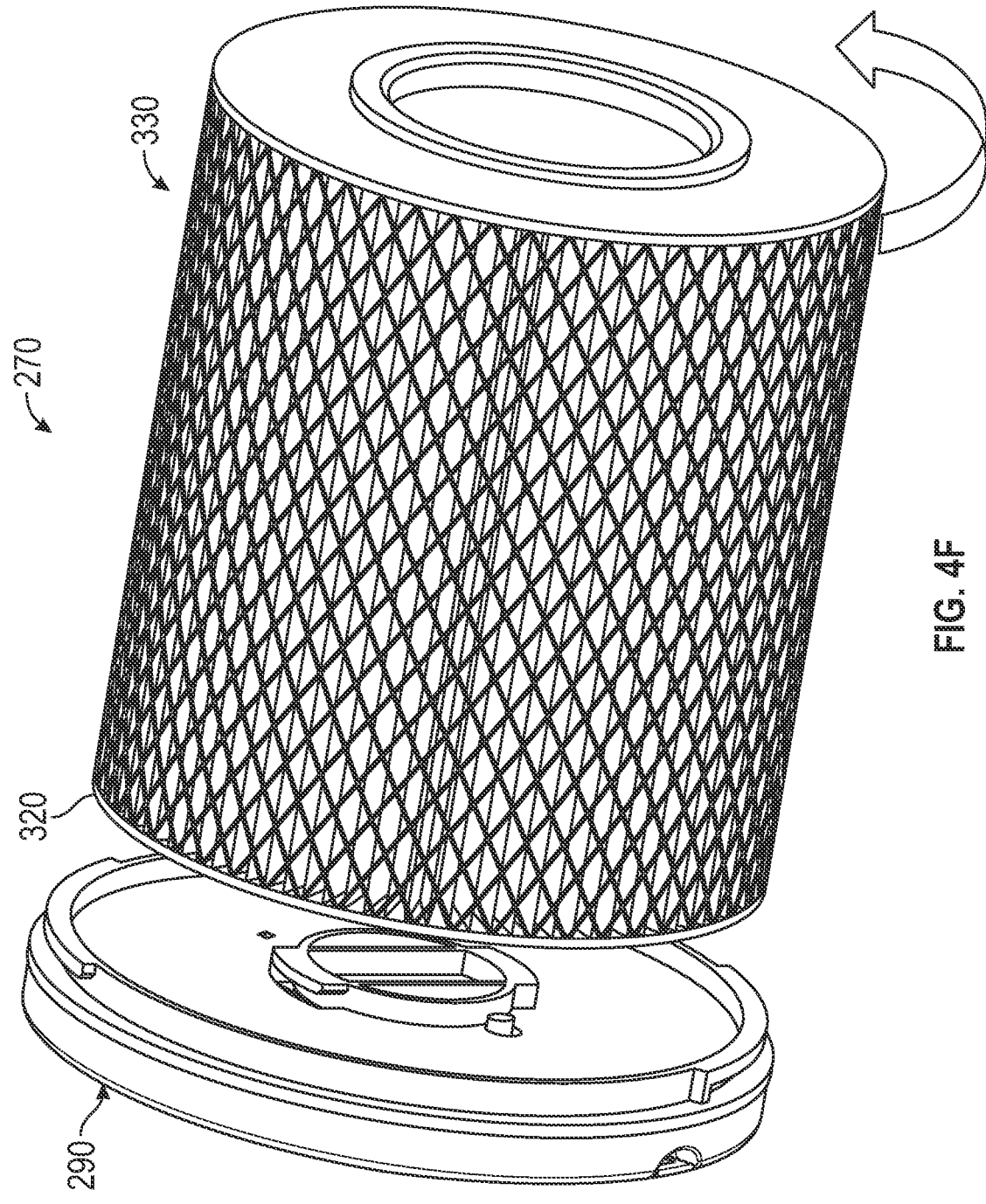
FIG. 4F is a perspective view of the removable main filter of the filter assembly and shows rotation of the main filter element relative to a holder to remove and replace the main filter element.

With reference to FIGS. 3A-3C, the intake assembly 120 includes flexible intake tubes 160 each with a proximal portion 170 and a distal portion 180. The distal portions are received in intake ports 190 of the housing 110. The proximal portions 170 include nozzles 200, which include nozzle inlet screen receivers 210 that receive replaceable nozzle inlet screens 220 within intake paths 225. The replaceable nozzle inlet screens 220 include tabs 230 that allow a user to insert the replaceable nozzle inlet screens 220 into (and pulled out of) the intake path via the nozzle inlet screen receivers 210. The replaceable nozzle inlet screens 220 provide a first filter to capture large items such as paper wipes that are drawn into the intake assembly 120 via the nozzles 200. The proximal portions 170 may include fans 240 with an outer periphery 250 that the nozzles 200 slide onto. The fans 240 help to move the air, harmful chemicals, and particulates through the intake assembly 120 and into the filter assembly 130.

With reference to FIGS. 4A-4F, the filter assembly 130 includes a pre-filter 260, a main filter 270, and impregnated activated carbon that remove greater or equal to 99.95 percent of the particles and gasses from the air that are as small as 0.12 μm.

The pre-filter 260 is a disposable liner to remove large particles before entering the main filter 270, which extends the life of the main filter 270. The pre-filter 260 is placed in a pre-filter tray 280, which is removable/insertable relative to an upper portion 262 of a front section 264 of the housing 110. The pre-filter 260 can easily be replaced at a workstation or bench without removing the main filter 270 or opening the housing 110.

The main filter 270 along with the impregnated activated carbon is externally removable so that one does not have to remove an inlet hose and/or open the unit to replace either filter, whether on the floor under a work bench or placed on a shelf of a workstation, as was required in the past. The main filter 270 includes a filter holder 290 with a releasable latch 300 on a peripheral portion 310 of a front face 315 of the filter holder 290. Pulling outward/frontward on the releasable latch 300 disengages the releasable latch 300 from a front end 320 of a main filter element 330, allowing rotatably coupled main filter element 330 and filter holder 290 to be rotated relative to each other to separate the main filter element 330 relative to the filter holder 290 to replace the main filter element 330. The main filter 270 is rotatably coupled to and insertable/removable relative to the front section 264 of the housing 110, below the pre-filter 260, for replacing the main filter element 330.

Figures 5A, 5B:
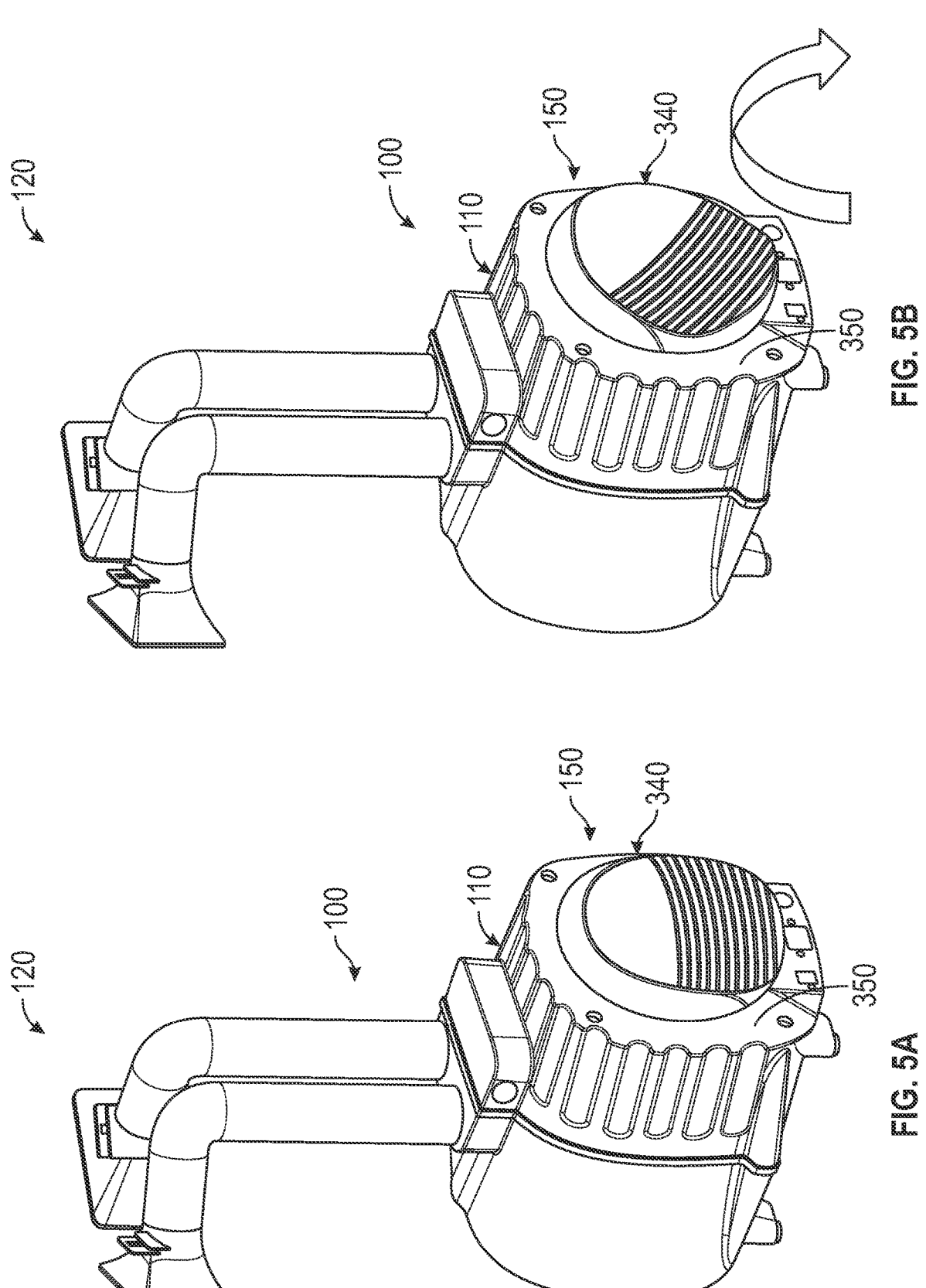
FIG. 5A is a rear perspective view of the extractor of FIG. 1, and shows a rotational exhaust vent of an exhaust assembly.
FIG. 5B is a rear perspective view, similar to FIG. 5A, and shows the rotational exhaust vent rotated so as to change exhaust air flow direction.
Figures 5C, 5D:
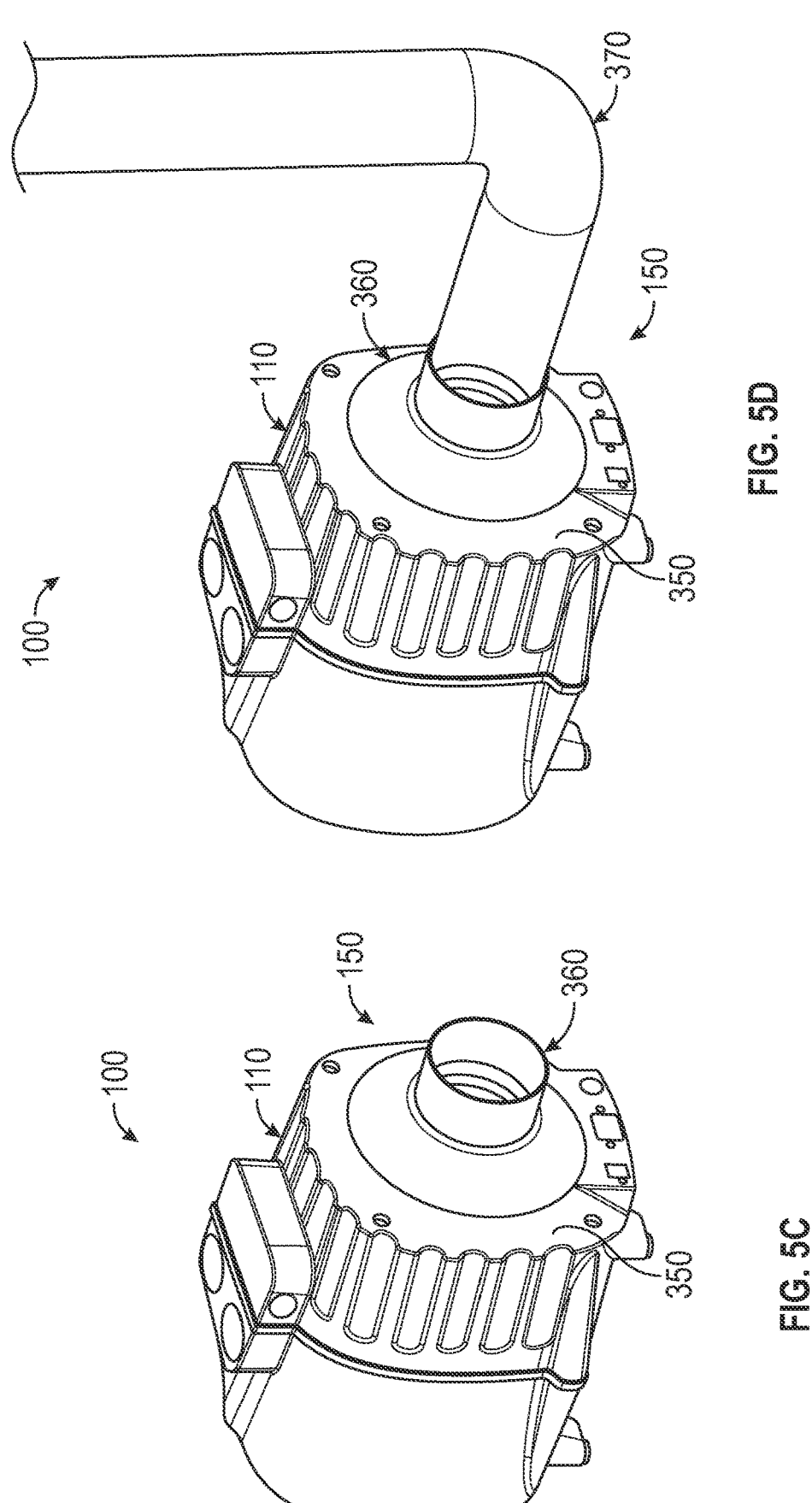
FIG. 5C is a rear perspective view, similar to FIG. 5A, and shows an optional exterior exhaust vent cover.
FIG. 5D is a rear perspective view, similar to FIG. 5C, and shows the optional exterior exhaust vent, which is connected to outside venting.

With reference to FIGS. 5A-5D, the exhaust assembly 150 will not be described in more detail. The exhaust assembly 150 includes a rotational exhaust vent 340 that is rotatably coupled to a rear section 350 of the housing 110 of the extractor 100 for 360 degree rotation to adjust the direction of exhaust air flow from the extractor 100. As shown in FIGS. 5A and 5B, an optional exterior exhaust vent cover 360 may be removably coupled to the rear section 350 of the housing 110 of the extractor 100 and a L-shaped exhaust tube 370 may be coupled to the exterior exhaust vent cover 360 to connect the exhaust assembly 150 to outside venting.

Figure 6:
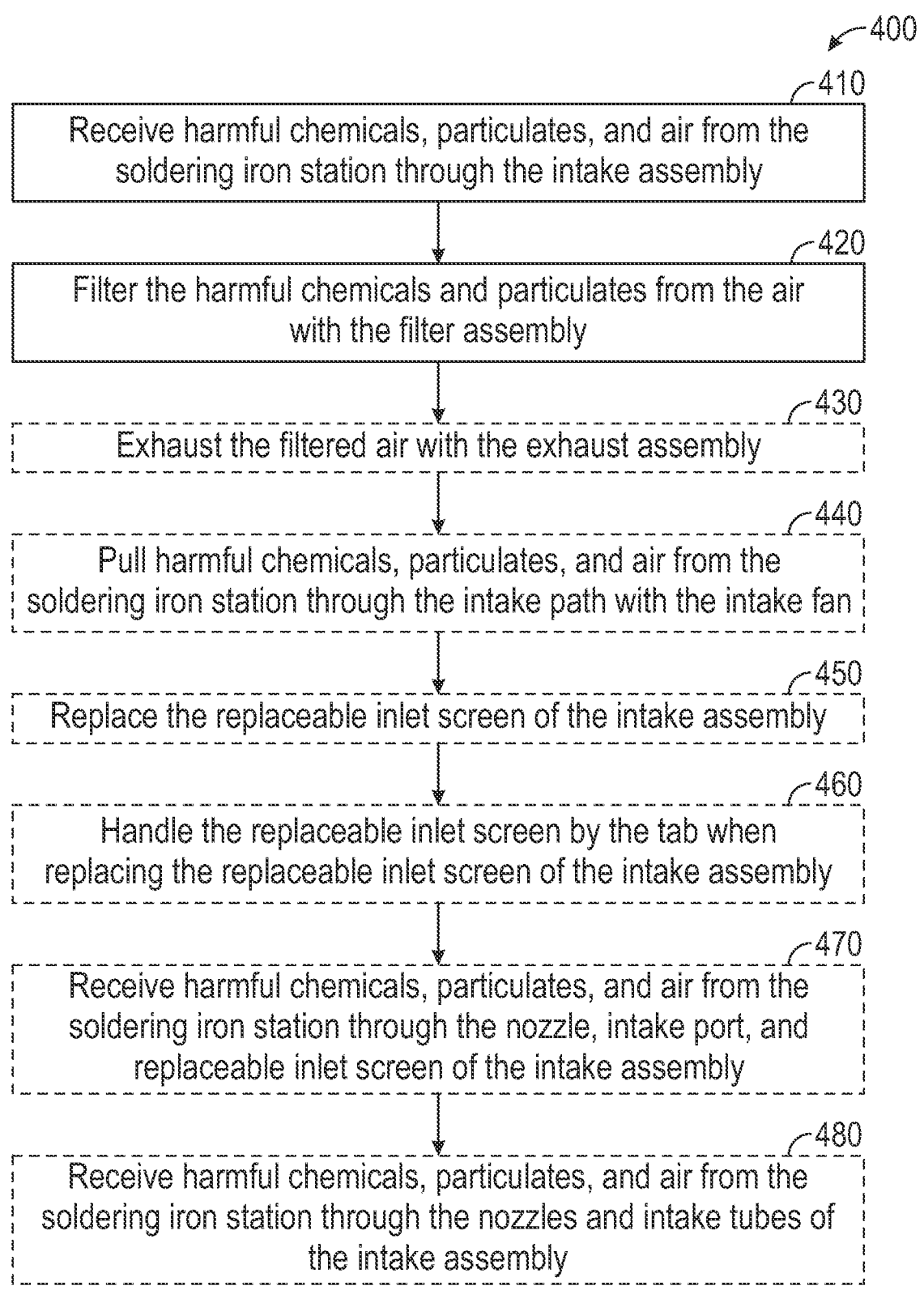
FIG. 6 is a flow chart of an exemplary method of using the extractor for extracting fumes from a soldering iron station.

With reference to FIG. 6, an exemplary method 400 of using the extractor 100 for extracting harmful chemicals and particulates from air for a soldering iron station will be described. In alternative embodiments, the method 400 is used for filtering applications other than for a soldering iron station. In block 410, the intake assembly 120 receives harmful chemicals, particulates, and air from the soldering iron station. In block 420, the filter assembly 130 filters the harmful chemicals and particulates from the air. In block 430, the exhaust assembly 150 exhausts the filtered air.

In other embodiments, one or more operations shown in blocks 440-560 may be performed. In block 440, the intake fan 240 pulls harmful chemicals, particulates, and air from the soldering iron station through the intake path(s) 225. In block 450, the replaceable inlet screen of the intake assembly 120 is replaced. In block 460, the tab 230 of the replaceable inlet screen 220 is handled to replace the replaceable inlet screen 220 of the intake assembly 120. In block 470, the nozzle 200, intake port 190, and replaceable inlet screen 220 of the intake assembly 120 receive harmful chemicals, particulates, and air from the soldering iron station there through. In block 480, the nozzle 200 and intake tube 160 of the intake assembly 120 receive harmful chemicals, particulates, and air from the soldering iron station. In block 490, the main filter 270 filters the harmful chemicals and particulates from the air, and the main filter 270 is removed from the side 115 of the housing 110 to replace the main filter 270. In block 500, the main filter 270 is rotated relative to the side 115 of the housing 110 to remove the main filter 270. In block 510, the main filter 270 is removed from the side 115 of the housing 110, the main filter element 330 is removed from the filter holder 290, and the main filter element 330 is replaced. In block 520, the releasable latch 300 disengages the front end 330 of the main filter element 330 to remove the main filter element 330 from the filter holder 290. In block 530, the pre-filter 260 and the main filter 270 filters the harmful chemical and particulates from the air. In block 540, the pre-filter tray 280 deploys from the side 115 of the housing 110 to replace the pre-filter 260. In block 550, the rotational exhaust vent 340 rotates to exhaust filtered air in a desired direction. In block 560, the exterior exhaust vent cover 360 and the exhaust tube 370 exhausts the filtered air to outside venting.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method of using an extractor for extracting harmful chemicals and particulates from air for a soldering iron station, the extractor including an intake assembly, a filter assembly, a fan, and an exhaust assembly, comprising:

receiving harmful chemicals, particulates, and air from the soldering iron station through the intake assembly;

filtering the fumes from the air with the filter assembly;

exhausting the filtered air with the exhaust assembly, wherein the extractor includes a housing with one or more sides and the filter assembly includes a main filter removable with respect to a side of the one or more sides of the housing, and wherein filtering the fumes comprises filtering the fumes from the air with the main filter, the method further comprising removing the main filter from the side of the housing at least partially by rotating the main filter relative to the side of the housing about an axis perpendicular to the side of the housing to replace the main filter.

2. The method of claim 1, wherein the intake assembly includes an intake path and an intake fan disposed therein, and receiving comprising pulling harmful chemicals, particulates, and air from the soldering iron station through the intake path with the intake fan.

3. The method of claim 1, wherein the intake assembly includes an intake path and replaceable inlet screen therein, and the method further comprising replacing the replaceable inlet screen of the intake assembly.

4. The method of claim 3, wherein the replaceable inlet screen include a tab, and replacing comprising handling the replaceable inlet screen by the tab when replacing the replaceable inlet screen of the intake assembly.

5. The method of claim 1, wherein the intake assembly includes a nozzle, an intake port, and a replaceable inlet screen disposed therein, and receiving comprising receiving harmful chemicals, particulates, and air from the soldering iron station through the nozzle, intake port, and replaceable inlet screen of the intake assembly.

6. The method of claim 1, wherein the intake assembly includes a pair of intake tubes with respective nozzles, and receiving comprising receiving harmful chemicals, particulates, and air from the soldering iron station through the nozzles and intake tubes of the intake assembly.

7. The method of claim 1, wherein the main filter includes a filter holder and a main filter element, and removing includes removing the main filter from the side of the housing, removing the main filter element from the filter holder, and replacing the main filter element.

8. The method of claim 7, wherein the main filter element includes a front end, the filter holder includes a peripheral portion with a latch that engageable with the front end of the main filter element, and removing the main filter element from the filter holder includes disengaging the latch from the front end of the main filter element.

9. The method of claim 1, wherein the filter assembly includes a pre-filter, and filtering comprising filtering the fumes from the air with the pre-filter and the main filter.

10. The method of claim 9, wherein the filter assembly includes a tray with the pre-filter that deploys from the side of the housing to replace the pre-filter, and the method further comprising deploying the tray to replace the pre-filter.

11. The method of claim 1, wherein the exhaust assembly includes a rotational exhaust vent, and the method further comprising rotating the rotational exhaust vent to exhaust filtered air in a desired direction.

12. The method of claim 1, wherein the exhaust assembly includes an exterior exhaust vent cover and an exhaust tube coupled to the exterior exhaust vent cover, and exhausting includes exhausting the filtered air to outside venting through the exterior exhaust vent cover and the exhaust tube.

* * * * *

5